United States Patent
Stockmann et al.

(12)

(10) Patent No.: US 6,334,334 B1
(45) Date of Patent: Jan. 1, 2002

(54) PROCESS FOR LIQUEFYING A HYDROCARBON-RICH STREAM

(75) Inventors: Rudolf Stockmann, Buchloe; Manfred Bölt, Olching; Manfred Steinbauer, Geretsried; Christian Pfeiffer, Gauting, all of (DE); Pentti Paurola, Hafrsfjord (NO); Wolfgang Förg, Icking (DE); Arne Olav Fredheim; Oystein Sorensen, both of Trondheim (NO)

(73) Assignee: Linde Aktiengesellschaft, Wiesbaden (DE)

( * ) Notice: Subject to any disclaimer, the term of this patent is extended or adjusted under 35 U.S.C. 154(b) by 0 days.

(21) Appl. No.: 09/629,089

(22) Filed: Jul. 31, 2000

Related U.S. Application Data

(63) Continuation of application No. 09/424,365, filed as application No. PCT/EP98/03128 on May 27, 1998, now abandoned.

(30) Foreign Application Priority Data

May 28, 1997 (DE) .......................................... 197 22 490

(51) Int. Cl.$^7$ ................................................ F25J 1/00
(52) U.S. Cl. .......................................... 62/612; 62/623
(58) Field of Search ................................... 62/612, 623

(56) References Cited

U.S. PATENT DOCUMENTS

| | | | | |
|---|---|---|---|---|
| 3,780,535 A | * | 12/1973 | Darredeau | 62/612 |
| 4,112,700 A | * | 9/1978 | Forg | 62/612 |
| 4,251,247 A | | 2/1981 | Gauberthier et al. | |
| 4,325,231 A | * | 4/1982 | Krieger | 62/612 |
| 4,404,008 A | * | 9/1983 | Rentler et al. | 62/612 |
| 4,486,210 A | | 12/1984 | Gauthier | |
| 5,535,594 A | | 7/1996 | Grenier | |

FOREIGN PATENT DOCUMENTS

| | | |
|---|---|---|
| DE | 2524179 | 1/1976 |
| DE | 2440215 | 3/1976 |
| EP | 58106 | 8/1982 |
| FR | 1270952 | 1/1962 |

* cited by examiner

Primary Examiner—Ronald Capossela
(74) Attorney, Agent, or Firm—Millen, White, Zelano & Branigan, P.C.

(57) ABSTRACT

In the liquefaction of a hydrocarbon by indirect heat exchange with the refrigerant mixture of a refrigerant mixture cycle, the refrigerant mixture being compressed in multiple stages, the compressed refrigerant mixture (23) is at least partially condensed (E4) downstream of the penultimate compressor stage and is fractionated (D4) into a higher-boiling liquid fraction (26) and a lower-boiling gas fraction (24). The lower-boiling gas fraction (24) is compressed to the final pressure, partially condensed (E5) and fractionated (D5) into a lower-boiling gas fraction (10) and a higher-boiling liquid fraction (27). The higher-boiling liquid fraction (27) is added to the partially condensed refrigerant mixture stream (23), and the gas fraction (10) forms the lower-boiling refrigerant mixture fraction and the liquid fraction (26) forms the higher boiling refrigerant mixture fraction of the refrigerant mixture cycle. Alternatively, the compressed refrigerant mixture (20, 31, 34) can be partially condensed (E3, E4, E5) after each compressor stage and fractionated in each case into a lower-boiling gas fraction (21, 32, 10) and a higher-boiling liquid fraction (30, 33, 35). Only the gas fraction (21, 32) from the partial condensation (E3, E4) in each case is further compressed and the liquid fractions (33, 35) from the second fractionation (D4, D5) are added to the partially condensed stream (20) from the first compressor stage upstream of its fractionation (D3). The gas fraction (10) from the final fractionation (D5) forms the lower-boiling refrigerant mixture fraction and the liquid fraction (30) from the first fractionation (D3) forms the higher-boiling refrigerant mixture fraction of the refrigerant mixture cycle.

18 Claims, 2 Drawing Sheets

PROCESS FOR LIQUEFYING A HYDROCARBON-RICH STREAM

Figure 1:
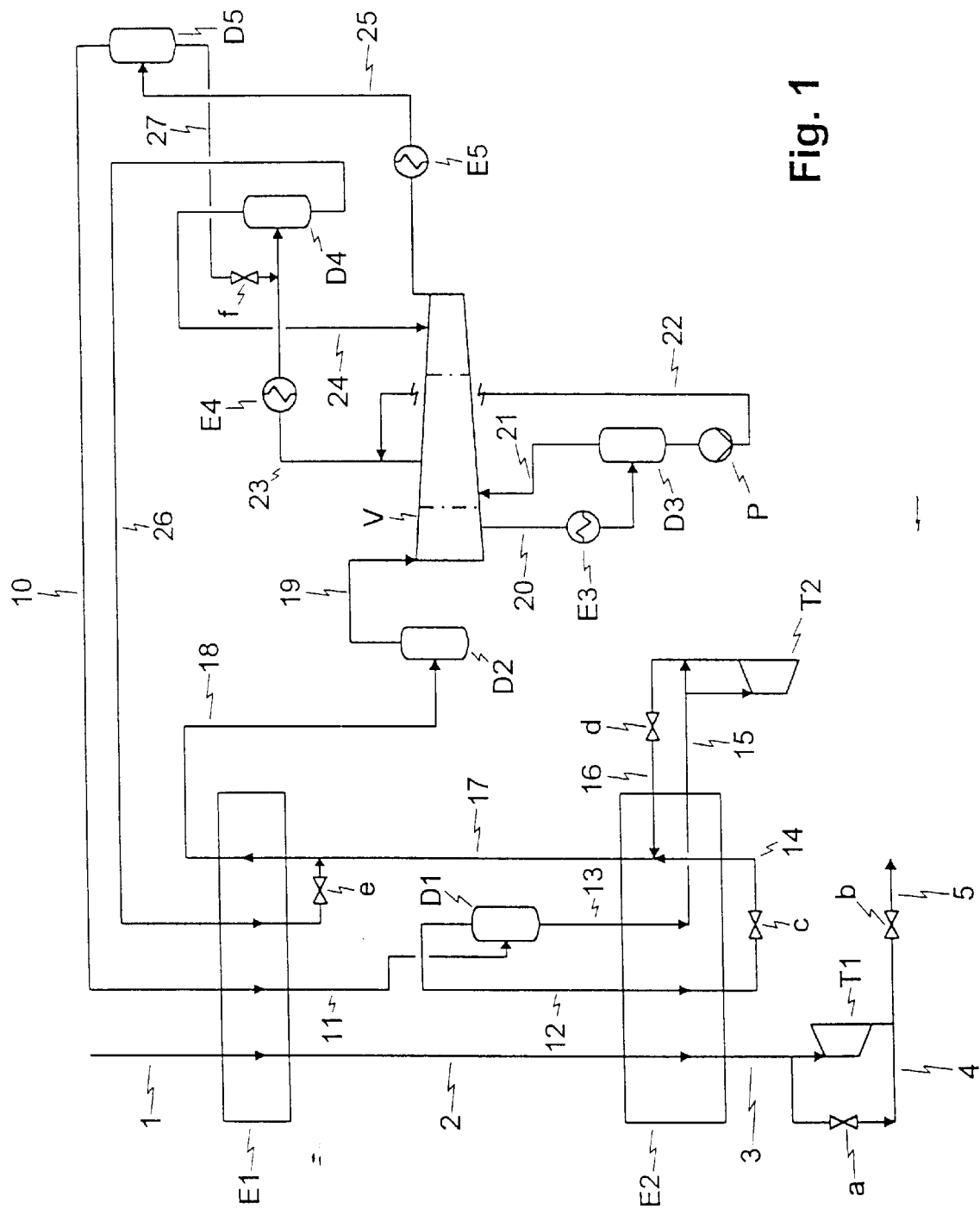

This application is a Continuation of application Ser. No. 09/424,365 Filed on May 27, 1998 now abandoned as PCT/EP98/03128 designating the US.

The invention relates to a process for liquefying a hydrocarbon-rich stream, in particular a natural gas stream, by indirect hear exchange with the refrigerant mixture of a refrigerant mixture cycle, the refrigerant mixture being compressed in two stages or multiple stages and where the refrigerant mixture is fractionated into at least one lower-boiling refrigerant mixture fraction and into at least one higher-boiling refrigerant mixture fraction.

Currently, most of the baseload-LNG plants are designed as what are termed dual-flow refrigeration processes. In these, the refrigeration energy required for liquefying the hydrocarbon-rich stream or the natural gas is provided by two separate refrigerant mixture cycles which are connected to a refrigerant mixture cycle cascade. A liquefaction process of this type is disclosed, for example, by GB-B 895 094.

In addition, liquefaction processes are known in which the refrigeration energy required for the liquefaction is provided by a refrigerant cycle cascade. but not a refrigerant mixture cycle cascade, see, for example, LINDE Berichte aus Technik und Wissenschaft, issue 75/1997, pages 3–8. The refrigerant cycle cascade described therein consists of a propane or propylene, an ethane or ethylene and a methane refrigeration cycle. Although this refrigerant cycle cascade can be considered to be optimized energetically, it is relatively complicated owing to the nine compressor stages.

In addition, liquefaction processes are known, for example as described in DE-B 19 60 301, in which the refrigeration energy required for the liquefaction is provided by a cascade consisting of a refrigerant mixture cycle and a propane precooling cycle.

Alternatively to the refrigerant or refrigerant mixture cycle cascades mentioned, the refrigeration energy required for the liquefaction can also be provided by only one refrigerant mixture cycle. These what are termed single-flow processes generally require a lower number of apparatuses and machines, compared with the abovementioned cascades, for which reason the capital expenditure costs are lower compared with processes having a plurality of refrigerant (mixture) cycles. In addition, the operation of such single-flow processes is comparatively simple. However, it is a disadvantage that the specific energy requirement for liquefaction is higher compared with processes having a plurality of refrigerant (mixture) cycles.

U.S. Pat. No. 5,535,594 discloses such a single-flow process in which the refrigerant mixture cycle stream is dissolved into two separate refrigerant mixture cycle streams, a higher-boiling refrigerant mixture fraction and a lower-boiling refrigerant mixture fraction, by means of a distillation column which is disposed between the penultimate and final compressor stage of the refrigerant compressor, and by means of a reflux separator which is disposed downstream of the last stage of the refrigerant compressor.

The higher-boiling refrigerant mixture fraction, that is the bottom product of the distillation column, is used for precooling the hydrocarbon-rich stream to be liquefied and the lower-boiling refrigerant fraction and for cooling against itself. The lower-boiling refrigerant mixture fraction, that is the overhead product of the reflux separator, is, after it has been precooled by the higher-boiling refrigerant mixture fraction, used for the liquefaction and subcooling of the hydrocarbon-rich stream to be liquefied and for cooling against itself.

The object of the present invention is to specify a process for liquefying a hydrocarbon-rich stream, in particular a natural gas stream, by means of what is termed a single-flow process, in which the specific energy requirement of the single-flow process is improved with retention of its advantages—low capital costs and simple and robust operation.

This is achieved according to the invention by means of the fact that a) the compressed refrigerant mixture is at least partially condensed downstream of the penultimate compressor stage, b) is fractionated into a higher-boiling liquid fraction and a lower-boiling gas fraction, c) the lower-boiling gas fraction is compressed to the final pressure, d) the compressed lower-boiling gas fraction is partially condensed, e) is fractionated into a lower-boiling gas fraction and a higher-boiling liquid fraction, f) the higher-boiling liquid fraction is added to the partially condensed refrigerant mixture stream, and g) the gas fraction forms the lower-boiling refrigerant mixture fraction and the liquid fraction forms the higher-boiling refrigerant mixture fraction of the refrigerant mixture cycle.

In a development of the process according to the invention it is proposed that the higher-boiling liquid fraction is expanded upstream of the addition to the partially condensed refrigerant mixture stream.

An alternative procedure to this described procedure of the invention is characterized in that a) the compressed refrigerant mixture is partially condensed downstream of each compressor stage and is fractionated each time into a lower-boiling gas fraction and a higher-boiling liquid fraction, b) only the gas fraction from each partial condensation is further compressed, c) the liquid fractions, from the second fractionation on, are added to the partially condensed stream from the first compressor stage prior to its fractionation and d) the gas fraction from the last fractionation forms the lower-boiling refrigerant mixture fraction and the liquid fraction from the first fractionation forms the higher-boiling refrigerant mixture fraction of the refrigerant mixture cycle.

According to an advantageous embodiment of the process of the invention, the liquid fraction produced by means of the fractionation is fed in each case to the preceding pressure stage stream which is to be fractionated upstream of its fractionation.

As a development of the process of the invention it is proposed that the liquid fraction produced by means of the fractionation is expanded upstream of the feed to the preceding pressure stage stream which is to be fractionated.

The process of the invention and other embodiments of the same are to be described in more detail with reference to FIGS. 1 and 2.

Possibly necessary pretreatment steps of the hydrocarbon-rich stream prior to the liquefaction, for example removal of acid gas and/or mercury, removal of heavy hydrocarbons etc., which are not subject matter of the present invention are not considered in more detail below.

The hydrocarbon-rich stream to be liquefied is fed via line 1 to a heat exchanger E1 and precooled in this against the refrigerant mixture (cycle) stream which is to be heated. The precooled hydrocarbon-rich stream is then fed via line 2 to the heat exchanger E2 and is liquefied and subcooled in this against the two partial streams of the refrigerant mixture cycle which will be considered in more detail below.

The liquefied and subcooled hydrocarbon-rich stream which is taken off from the heat exchanger E2 via line 3 is either expanded in the liquid expansion turbine T1 or, alternatively to this, in an expansion valve a which is provided in the bypass line 4. Then, the liquefied and subcooled hydrocarbon-rich stream is fed to a further processing stage, for example a nitrogen-separation stage, and/or is expanded via the valve b and line 5 into a storage vessel operating at approximately atmospheric pressure. The valve b serves for maintaining pressure, which prevents vaporization of the liquefied and subcooled stream at the outlet of the liquid expansion turbine T1.

The refrigerant mixture stream taken off from the heat exchanger E1 via line 18 is fed to a suction vessel D2 which serves to protect the first compressor stage. From this suction vessel the refrigerant mixture stream which is to be compressed is fed via line 19 to the first stage of the compressor V. The compressor V has two or more, three in the case of FIGS. 1 and 2, compressor stages; these are shown by the two dash-dotted lines.

A condensate which may arise downstream of the first compressor stage of the compressor V is fed via line 20 to a separator D3. In this line 20 is provided a cooler E3. The gas fraction arising at the top of the separator D3 is fed via line 21 to the suction side of the second compressor stage of the compressor V. The liquid fraction taken off from the separator D3 is pumped by means of the pump P1 to the final pressure of the second compressor stage of the compressor V and added via line 22 to the outlet stream of this second compressor stage in line 23.

The compressed refrigerant mixture stream in line 23 is partially condensed in a further cooler E4 and fed to the separator D4. The cooling or condensation of the respective streams from the individual compressor stages in the heat exchangers or coolers E3, E4 and E5 can be effected with seawater or cooling water, air or any other suitable cooling medium.

The gas fraction arising at the top of the separator D4 is fed via line 24 to the final compressor stage of the compressor V. The higher-boiling liquid fraction from the separator D4 is fed via line 26 to the heat exchanger E1; this liquid fraction will be considered in more detail below.

The refrigerant stream compressed in the final compressor stage of the compressor V is cooled and partially condensed in the heat exchanger E5. Then, the refrigerant mixture stream is fed via line 25 to the separator D5. At the top of this separator D5 a lower-boiling gas fraction is taken off via line 10 and fed to the heat exchanger E1. At the bottom of the separator D5 a higher-boiling liquid fraction is taken off via line 27, expanded in valve f to the final pressure of the second compressor stage and added to the already partially condensed refrigerant mixture in line 23.

The gas fraction taken off at the top of the separator D5 via line 10 forms the lower-boiling refrigerant mixture fraction of the refrigerant mixture cycle, while the liquid fraction taken off from the separator D4 via line 26 forms the higher-boiling refrigerant mixture fraction of the refrigerant mixture cycle.

The lower-boiling refrigerant mixture fraction and the higher-boiling refrigerant mixture fraction are fed via lines 10 and 26, as mentioned above, to the heat exchanger E1. The lower-boiling refrigerant mixture fraction precooled in heat exchanger E1 is fed via line 11 to the separator D1. At the top of this separator D1 a gaseous fraction is taken off via line 12 and fed to the heat exchanger E2, liquefied and subcooled in this and then expanded in valve c. This fraction is then fed back via line 14 to the heat exchanger E2 and vaporized against the hydrocarbon-rich stream which is to be condensed and subcooled as well as against itself.

From the bottom of separator D1, a liquid fraction is taken off via line 13 and fed to the heat exchanger E2, subcooled in this and then fed via line 15 to a liquid expansion turbine T2 and expanded in this. Alternatively to this, this subcooled fraction can also be expanded in a valve, which is not shown in the figure, which is disposed in parallel to the liquid expansion turbine T2. Via line 16, in which a valve d is provided, the expanded fraction is added to the heated stream in line 14. The valve d in turn serves for maintaining pressure, which prevents vaporizing of the liquid at the outlet of the liquid expansion turbine T2.

The mixed stream is further vaporized and heated in heat exchanger E2 against the hydrocarbon-rich stream which is to be liquefied and against the liquid fraction and the gas fraction of the separator D1 in lines 13 and 12, respectively. Then, this stream is fed via line 17 to the heat exchanger E1 and heated in this against the hydrocarbon-rich stream which is to be precooled and against the lower-boiling refrigerant mixture fraction which is to be precooled and the higher-boiling refrigerant mixture fraction which is to be precooled. Thereupon, this refrigerant mixture stream is fed, as described above, via line 18 to the suction vessel D2.

The higher-boiling refrigerant mixture fraction fed to the heat exchanger E1 via line 26 is cooled in heat exchanger E1 and then expanded in valve e. The expanded higher-boiling refrigerant mixture fraction is then added to the lower-boiling refrigerant fraction in line 17.

By resolving the refrigerant mixture stream of the single-flow process into a lower-boiling refrigerant mixture fraction and a higher-boiling refrigerant mixture fraction, the specific energy consumption of the process is improved. Since for this fractionation only two separators are used, that is to say separators D4 and D5, the increase in apparatus required for the fractionation is low. The two said separators can serve here simultaneously as collection vessels for the refrigerant mixture or the two refrigerant mixture fractions. They thus replace a collection vessel which would also have to be provided in a single-flow process without resolution of the refrigerant mixture.

As mentioned above, the compressor outlet streams are cooled in the coolers or heat exchangers E3, E4 and E5 by means of suitable coolants, such as seawater or cooling water, air etc. In order to increase the efficiency of the fractionation into a lower-boiling refrigerant mixture fraction and a higher-boiling refrigerant mixture fraction, in the case of high coolant temperatures, the refrigerant mixture stream is further cooled downstream of the penultimate compressor stage, in addition to the cooling in heat exchanger E4, in another heat exchanger, using a chilled water unit or in heat exchanger E1 for example, and only then fed to the separator D4.

Figure 2:
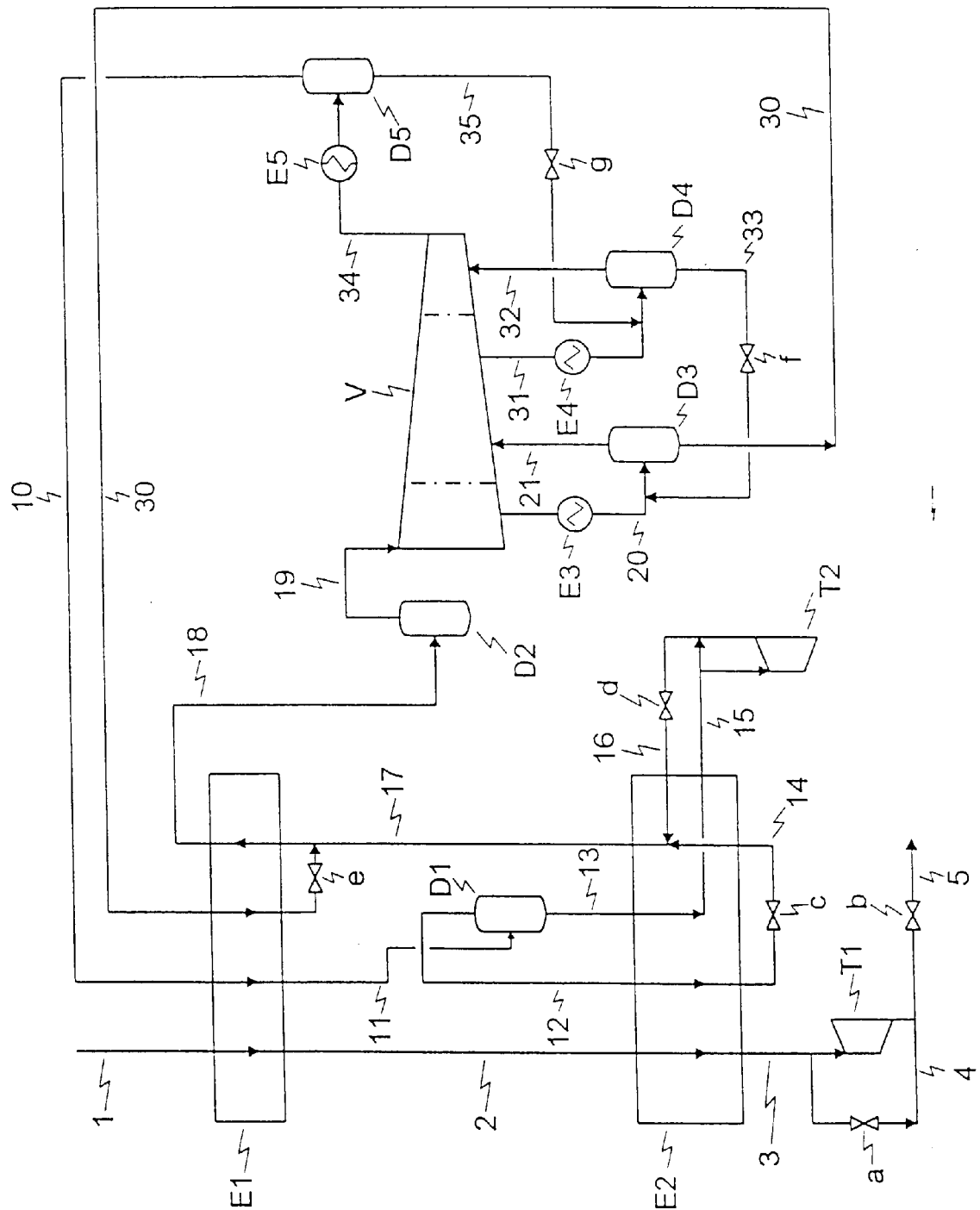

A process procedure alternative to the process procedure shown in FIG. 1 is shown in FIG. 2. Below, only the differences between the process procedures of FIGS. 1 and 2 will be considered.

In the case of the mode of operation according to FIG. 2, the higher-boiling refrigerant mixture fraction is not formed from the liquid taken off at the bottom of the separator D4 but from the liquid taken off at the bottom of separator D3 via line 30. This has the advantage that the pump P which is necessary in the process procedure according to FIG. 1 and pumps the liquid taken off from the separator D3 via line 22 to the final pressure of the second compressor stage can be omitted.

The liquid fraction taken off from the bottom of separator D4 via line 33, which previously formed the higher-boiling refrigerant mixture fraction, is expanded in valve f and added to line 20 and thus recirculated upstream of the compressor D3. The gaseous overhead fraction of separator D4 is fed via line 32 to the final compressor stage of the compressor V. The compressor V in this case has three compressor stages; these are shown by the two dash-dotted lines.

The refrigerant stream compressed in the final compressor stage of the compressor V is cooled and partially condensed in the heat exchanger E5. Then, the refrigerant mixture stream is fed via line 34 to the separator D5. The gaseous fraction taken off at the top of the separator D5 via line 10 forms, as in the mode of operation according to FIG. 1, the lower-boiling refrigerant mixture fraction of the single-flow process. The liquid fraction arising at the bottom of the separator D5 is recirculated via line 35 and valve g upstream of the separator D4.

While the lower-boiling refrigerant mixture fraction (10) essentially consists of from 5 to 20 mol % of $N_2$, from 30 to 55 mol % of $CH_4$, from 30 to 55 mol % of $C_2H_6$ or $C_2H_4$, from 0 to 10 mol % of $C_3H_8$ or $C_3H_6$ and from 0 to 10 mol % of $iC_4H_{10}$ of $nC_4H_{10}$, the higher-boiling refrigerant mixture fraction (26, 30) of the refrigerant mixture cycle has a composition of from 0 to 5 mol % of $N_2$, from 0 to 15 mol % of $CH_4$, from 25 to 55 mol % of $C_2H_6$ or $C_2H_4$, from 0 to 20 mol % of $C_3H_8$ or $C_3H_6$, from 30 to 60 mol % of $iC_4H_{10}$ or $nC_4H_{10}$ and from 0 to 5 mol % of $C_5H_{12}$.

In a development of the process according to the invention, it is proposed that if, for the compression of the refrigerant mixture, at least two series-connected compressors are used, these are driven by only one drive apparatus, for example a gas turbine. This embodiment of the process according to the invention leads to a decrease in the capital costs.

What is claimed is:

1. In a process for liquefying a hydrocarbon-rich stream by indirect heat exchange with the refrigerant mixtures of a refrigerant mixture cycle, wherein the refrigerant mixture is compressed in at least a penultimate pressure stage and a final pressure stage and the refrigerant mixture is fractionated into at least one lower-boiling refrigerant mixture fraction and into at least one higher-boiling refrigerant mixture fraction, the improvement comprising the following steps:

a) at least partially condensing (E4) a compressed refrigerant mixture (23) downstream of the penultimate compressor stage, b) fractionating (D4) the resultant condensate from step (a) into a higher-boiling liquid fraction (26) and a lower-boiling gas fraction (24), c) compressing the lower-boiling gas fraction (24) in the final pressure stage, d) partially condensing (E5) the compressed lower-boiling gas fraction, e) fractionating (D5) the resultant partially condensed fluid from step (a) into a lower-boiling gas fraction (10) and a higher-boiling liquid fraction (27), f) adding the higher-boiling liquid fraction (27) to the partially condensed refrigerant mixture stream (23) prior to fractionation in step (b), and g) providing the gas fraction (10) as the lower-boiling refrigerant mixture fraction and the liquid fraction (26) as the higher-boiling refrigerant mixture fraction of the refrigerant mixture cycle.

2. A process for liquefying a hydrocarbon rich stream according to claim 1, wherein the higher-boiling liquid fraction (27) is expanded (f) upstream of the addition to the partially condensed refrigerant mixture stream (23).

3. A process for liquefying a hydrocarbon-rich stream according to claim 1 wherein the lower-boiling refrigerant mixture fraction (10) comprises 5 to 20 mol % of $N_2$, 30 to 55 mol % Of $CH_4$, 30 to 55 mol % Of $C_2H_6$ or $C_2H_4$, 0 to 10 mol % of $C_3H_8$ or $C_3H_6$ and 0 to 10 mol % of $iC_4H_{10}$ of $nC_4H_{10}$, the higher-boiling refrigerant mixture fraction (26, 30) of the refrigerant mixture cycle comprises 0 to 5 mol % of $N_2$, 0 to 15 mol % of $CH_4$, 25 to 55 mol % of $C_2H_6$ or $C_2H_4$, 0 to 20 mol % of $C_3H_8$ or $C_3H_6$, 30 to 60 mol % of $iC_4H_{10}$ or $nC_4H_{10}$ and 0 to 5 mol % of $C_5H_{12}$.

4. A process for liquefying a hydrocarbon-rich stream according to claim 1 comprising compressing the refrigerant mixture with series-connected compressors driven by only one drive apparatus.

5. A process for liquefying a hydrocarbon-rich stream according to claim 1 further comprising in the case of a plant or process downtime, storing the lower-boiling refrigerant mixture fraction and the higher-boiling refrigerant mixture fraction temporarily in at least two separate separators/storage vessels (D3, D4, D5).

6. A process according to claim 1 wherein the hydrocarbon-rich stream is a natural gas stream.

7. In a process for liquefying a hydrocarbon-rich stream, by indirect heat exchange with the refrigerant mixture of a refrigerant mixture cycle, wherein the refrigerant mixture is compressed in multiple stages and the refrigerant mixture is fractionated into at least one lower-boiling refrigerant mixture fraction and into at least one higher-boiling refrigerant mixture fraction, the improvement comprising the following steps:

a) at least partially condensing (E3, E4, E5) the compressed refrigerant mixture (20, 31, 34) downstream of each compressor stage and fractionating (D3, D4, D5) each condensate into a lower-boiling gas fraction (21, 32, 10) and a higher-boiling liquid fraction (30, 33, 35), b) further compressing only the gas fraction (21, 32) from each partial condensation (E3, E4), c) adding the liquid fractions (33, 35), from the fractionating step associated with pressure stage(s) (D4, D5) having a pressure higher than the first compressor stage to the partially condensed stream (20) from the first compressor stage prior to its fractionation (D3) and d) providing the gas fraction (10) from the last fractionation (D5) as the lower-boiling refrigerant mixture fraction and the liquid fraction (30) from the first fractionation (D3) as the higher-boiling refrigerant mixture fraction of the refrigerant mixture cycle.

8. A process for liquefying a hydrocarbon-rich stream according to claim 7, wherein the liquid fraction (33, 35) produced by fractionation steps (D4, D5) is fed in each case to the preceding pressure stage stream which is to be fractionated (20, 31) upstream of its fractionation (D3, D4).

9. A process for liquefying a hydrocarbon-rich stream according to claim 7, wherein the liquid fraction (33, 35) produced by fractionation steps (D4, D5) is expanded (f, g) upstream of the feed to the preceding pressure stage stream (20, 31) which is to be fractionated.

10. A process according to claim 7 wherein the hydrocarbon-rich stream is a natural gas stream.

11. In a process for liquefying a hydrocarbon-rich stream by indirect heat exchange with the refrigerant mixtures of a refrigerant mixture cycle, wherein the refrigerant mixture is compressed in multiple stages and the refrigerant mixture is fractionated into at least one lower-boiling refrigerant mixture fraction and into at least one higher-boiling refrigerant mixture fraction, the improvement comprising the following steps:

a) at least partially condensing a compressed refrigerant mixture (23), b) fractionating (D4) the resultant condensate from step (a) into a higher-boiling liquid fraction (26) and a lower-boiling gas fraction (24), c) compressing the lower-boiling gas fraction (24), d) partially condensing (E5) the compressed lower-boiling gas fraction, e) fractionating (D5) the resultant partially condensed fluid from step (a) into a lower-boiling gas fraction (10) and a higher-boiling liquid fraction (27), f) adding the higher-boiling liquid fraction (27) to the partially condensed refrigerant mixture stream (23) prior to fractionation in step (b), and g) providing the gas fraction (10) as the lower-boiling refrigerant mixture fraction and the liquid fraction (26) as the higher-boiling refrigerant mixture fraction of the refrigerant mixture cycle.

12. A process for liquefying a hydrocarbon-rich stream according to claim 11 wherein the lower-boiling refrigerant mixture fraction (10) comprises 5 to 20 mol % of $N_2$,
30 to 55 mol % of $CH_4$,
30 to 55 mol % of $C_2H_6$ or $C_2H_4$,
0 to 10 mol % of $C_3H_8$ or $C_3H_6$ and
0 to 10 mol % of $iC_4H_{10}$ or $nC_4H_{10}$,
the higher-boiling refrigerant mixture fraction (26, 30) of the refrigerant mixture cycle comprises
0 to 5 mol % of $N_2$,
0 to 15 mol % of $CH_4$,
25 to 55 mol % of $C_2H_6$ or $C_2H_4$,
0 to 20 mol % of $C_3H_8$ or $C_3H_6$,
30 to 60 mol % of $iC_4H_{10}$ or $nC_4H_{10}$ and
0 to 5 mol % of $C_5H_{12}$.

13. In a process for providing fractions of a refrigerant mixture cycle, wherein the refrigerant mixture is compressed in multiple stages comprising at least a penultimate pressure stage and a final pressure stage and the refrigerant mixture is fractionated into at least one lower-boiling refrigerant mixture fraction and into at least one higher-boiling refrigerant mixture fraction, the improvement comprising the following steps:

a) at least partially condensing (E4) a compressed refrigerant mixture (23) downstream of the penultimate compressor stage, b) fractionating (D4) the resultant condensate from step (a) into a higher-boiling liquid fraction (26) and a lower-boiling gas fraction (24), c) compressing the lower-boiling gas fraction (24) in the final pressure stage, d) partially condensing (E5) the compressed lower-boiling gas fraction, e) fractionating (D5) the resultant partially condensed fluid from step (a) into a lower-boiling gas fraction (10) and a higher-boiling liquid fraction (27), f) adding the higher-boiling liquid fraction (27) to the partially condensed refrigerant mixture stream (23) prior to fractionation in step (b), and g) providing the gas fraction (10) as the lower-boiling refrigerant mixture fraction and the liquid fraction (26) as the higher-boiling refrigerant mixture fraction of the refrigerant mixture cycle.

14. A process according to claim 13 wherein the lower-boiling refrigerant mixture fraction (10) comprises 5 to 20 mol % of $N_2$,
30 to 55 mol % of $CH_4$,
30 to 55 mol % of $C_2H_6$ or $C_2H_4$,
0 to 10 mol % of $C_3H_8$ or $C_3H_6$ and
0 to 10 mol % of $iC_4H_{10}$ or $nC_4H_{10}$,
the higher-boiling refrigerant mixture fraction (26, 30) of the refrigerant mixture cycle comprises
0 to 5 mol % of $N_2$,
0 to 15 mol % of $CH_4$,
25 to 55 mol % of $C_2H_6$ or $C_2H_4$,
0 to 20 mol % of $C_3H_8$ or $C_3H_6$,
30 to 60 mol % of $iC_4H_{10}$ or $nC_4H_{10}$ and
0 to 5 mol % of $C_5H_{12}$.

15. In a process for providing fractions of a refrigerant mixture, wherein the refrigerant mixture is compressed in multiple stages and the refrigerant mixture is fractionated into at least one lower-boiling refrigerant mixture fraction and into at least one higher-boiling refrigerant mixture fraction, the improvement comprising the following steps:

a) at least partially condensing (E3, E4, E5) the compressed refrigerant mixture (20, 31, 34) downstream of each compressor stage and fractionating (D3, D4, D5) each condensate into a lower-boiling gas fraction (21, 32, 10) and a higher-boiling liquid fraction (30, 33, 35), b) further compressing only the gas fraction (21, 32) from each partial condensation (E3, E4), c) adding the liquid fractions (33, 35), from the fractionating step associated with pressure stages (D4, D5) having a higher pressure than the first compressor stage to the partially condensed stream (20) from the first compressor stage prior to its fractionation (D3) and d) providing the gas fraction (10) from the last fractionation (D5) as the lower-boiling refrigerant mixture fraction and the liquid fraction (30) from the first fractionation (D3) as the higher-boiling refrigerant mixture fraction of the refrigerant mixture cycle.

16. A process according to claim 15 wherein the liquid fraction (33, 35) produced by fractionation steps (D4, D5) is fed in each case to the preceding pressure stage stream which is to be fractionated (20,31) upstream of its fractionation (D3, D4).

17. A process according to claim 15 wherein the liquid fraction (33, 35) produced by fractionation steps (D4, D5) is expanded (f, g) upstream of the feed to the preceding pressure stage stream (20, 31) which is to be fractionated.

18. A process according to claim 15 wherein the lower-boiling refrigerant mixture fraction (10) comprises 5 to 20 mol % of $N_2$,
30 to 55 mol % of $CH_4$,
30 to 55 mol % of $C_2H_6$ or $C_2H_4$,
0 to 10 mol % of $C_3H_8$ or $C_3H_6$ and
0 to 10 mol % of $iC_4H_{10}$ or $nC_4H_{10}$, the higher-boiling refrigerant mixture fraction (26, 30) of the refrigerant mixture cycle comprises 0 to 5 mol % of $N_2$,
0 to 15 mol % of $CH_4$,
25 to 55 mol % of $C_2H_6$ or $C_2H_4$,
0 to 20 mol % of $C_3H_8$ or $C_3H_6$,
30 to 60 mol % of $iC_4H_{10}$ or $nC_4H_{10}$ and
0 to 5 mol % of $C_5H_{12}$.

* * * * *

UNITED STATES PATENT AND TRADEMARK OFFICE
CERTIFICATE OF CORRECTION

PATENT NO. : 6,334,334 B1
DATED : January 1, 2002
INVENTOR(S) : Rudolf Stockmann et al.

It is certified that error appears in the above-identified patent and that said Letters Patent is hereby corrected as shown below:

<u>Title page,</u>
Item [73], Assignee, please add: -- STATOIL ASA of Stavanger, Norway N-4035 -- as the second Assignee.

Signed and Sealed this

Fourth Day of May, 2004

JON W. DUDAS
*Acting Director of the United States Patent and Trademark Office*